INVENTORS
HIROH KAGEYAMA
HAJIME OKAMOTO
MASAAKI IIDA
KO OHNA

BY Kurt Kelman

AGENT

United States Patent Office 3,185,703
Patented May 25, 1965

3,185,703
RACEMIZATION OF OPTICALLY-ACTIVE PYROGLUTAMIC ACID
Hiroh Kageyama and Hajime Okamoto, Yokohama-shi, Kanagawa-ken, and Masaaki Iida, Ohta-ku, Tokyo, and Ko Ohno, Setagayaku, Tokyo, Japan, assignors to Ajinomoto Co., Inc., Tokyo, Japan
Filed July 17, 1962, Ser. No. 210,533
Claims priority, application Japan, July 18, 1961, 36/25,221
4 Claims. (Cl. 260—326.3)

The present invention relates to the racemization of optically-active pyroglutamic acid.

It has been proposed to racemize optically-active pyroglutamic acid by autoclaving optically-active glutamic acid at a temperature between 190° C. and 200° C., whereby the acid is molten and liquefied, forming pyroglutamic acid, and further heating at 200° C. for three to four hours. However, this process cannot be practiced on an industrial scale because, in the first place, so much pyroglutamic acid is lost due to decomposition that the yield is unacceptably low (46%) and an r-pyroglutamic acid of inferior quality is produced, and in the second place, the molten material is difficult to agitate during racemization and conducts heat poorly. Furthermore, a corrosion-resistant autoclave is needed for carrying out the reaction and its is often difficult, and always expensive, to provide the proper material for the reaction vessel in which the racemization is carried out under reduced pressure.

It has also been proposed to racemize optically-active glutamic acid, for instance, by heating it in an aqueous solution with a strongly alkaline or acidic substance, by heating the acid until it melts, by heating a mixture of the acid with phthalic anhydride until the mixture melts, or by acetylating the acid. On an industrial scale, all of these racemization processes have been difficult to carry out because the loss of glutamic acid due to decomposition is large, or a considerable amount of expensive reagents are required, or corrosion-resistant reaction vessels are required.

It is the primary object of the present invention to provide an easy and cheap industrial process for the racemization of optically-active pyroglutamic acid.

It is a further object of this invention to convert r-pyroglutamic acid into r-glutamic acid.

The above and other objects and advantages are accomplished in accordance with the invention and the rapid racemization of optically-active pyroglutamic acid is obtained by heating the acid in an aqueous solution. This process is industrially effective if the acid is mixed with water in a weight ratio of acid to water between 10:90 and 90:10, and any alkaline or other acidic substance present in the mixture is limited to a molar ratio of less than 0.75 in the case of an alkaline substance and less than 1, preferably less than 0.5, in the case of an acidic substance, in relation to the pyroglutamic acid. The mixture is then heated to a temperature of about 160–220° C., preferably above 180° C. The preferred minimum content of pyroglutamic acid is 30%, by weight of the water.

It is known that, when glutamic acid is boiled in an aqueous solution containing an alkaline or acidic substance, a part of the glutamic acid is converted into pyroglutamic acid due to dehydration and an equilibrium is set up between the two materials, depending on the pH. Therefore, r-pyroglutamic acid produced by the process of the present invention may be hydrolyzed to convert it into r-glutamic acid or its salts by heating it with an acid or alkaline substance. Therefore, the invention provides also a simple and cheap process of obtaining racemized glutamic acid, which is free of the shortcomings of conventional racemization processes of glutamic acid.

L-glutamic acid, which is useful as a seasoning and for other purposes, may be produced from synthetic glutamic acid by resolving the thus obtained r-glutamic acid by any suitable process, a number of such processes being well known in the art.

In the accompanying drawing, the optimum conditions of the process of this invention are illustrated. In the drawing, FIG. 1 is a graph showing the relationship between the concentration of the optically-active pyroglutamic acid in the water mixture and the time required for 99% racemization.

Figure 1:
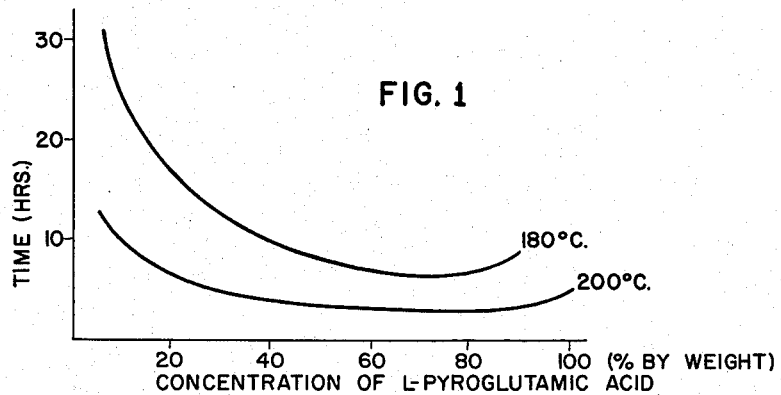

As will be seen from the graph of FIG. 1, at the respective temperatures of 180° C. and 200° C., the racemization time is extended at low concentrations of the optically-active (L-) pyroglutamic acid in the aqueous mixture. The racemization time decreases noticeably when the concentration exceeds 10% and, more particularly, at a range above 30%, but begins to increase again above a concentration of about 90%. In the higher concentration range, the acid comes closer and closer to the molten state and the yield of the r-acid accordingly decreases. This graph clearly shows the useful concentration range of the pyroglutamic acid to be between 10% and 90%, preferably at least 30%, by weight.

Minor inorganic or organic impurities in the solution have been found to have no harmful effect on the racemization.

Figure 2:
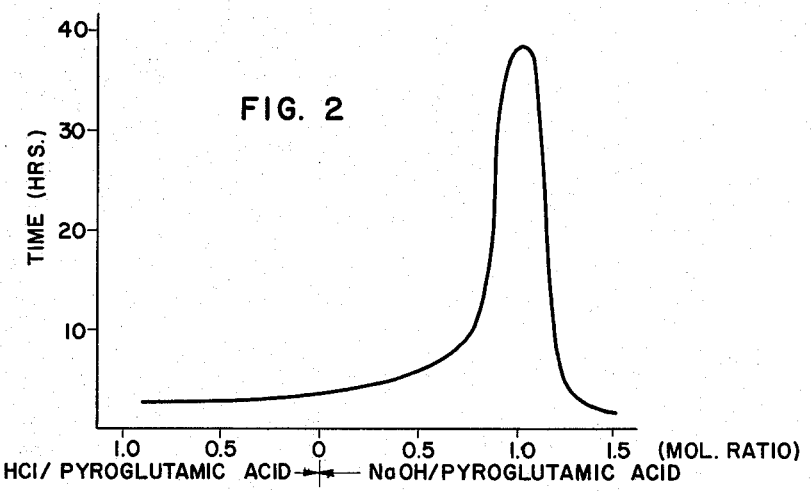
FIG. 2 is a graph illustrating the time required for 99% racemization in the presence of an acidic or alkaline substance in the aqueous mixture.

FIG. 2 shows the relationship between the time required for 99% racemization and the amount of hydrochloric acid or sodium hydroxide in a 30% aqueous L-pyroglutamic acid solution. As will be seen from the right side of the graph, as soon as the molar ratio of NaAH to pyroglutamic acid exceeds 0.75, the racemization time is abruptly increased to a maximum point where equal molar amounts of pyroglutamic acid and caustic soda are present. The presence of either another acid (see left side of graph) or alkali in a mole ratio of less than 0.75 has no substantial bearing on the racemization time. However, since an increase in the acid content requires expensive corrosion-resistant materials for the reaction vessel, an industrially effective process requires that the molar ratio of the other acid to pyroglutamic acid should be held below 1, preferably below 0.5.

Figure 3:
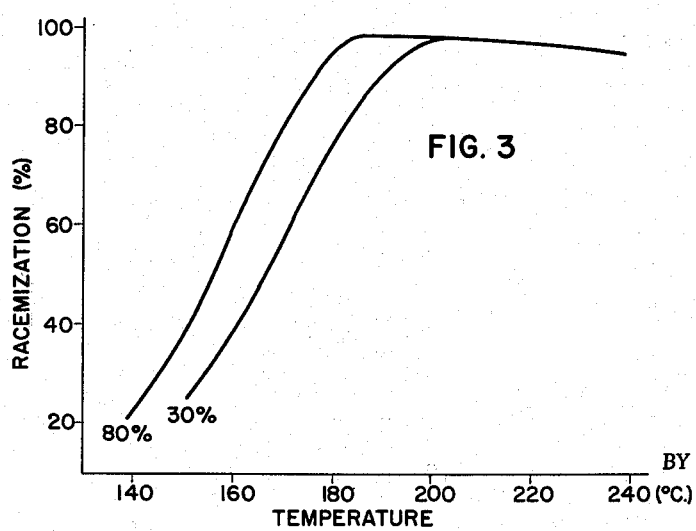
FIG. 3 is a graph showing the yield of the r-acid at a given time at different temperatures of racemization.

The graph of FIG. 3 shows the rate of racemization, i.e., the yield of r-pyroglutamic acid, of 30% and 80% aqueous solutions of optically-active pyroglutamic acid when heated for 4.8 hours each. At a temperature below 160° C., the racemization speed is too slow for industrial purposes. Good results are obtained at 180° C. and almost 100% racemization is obtained in 4.8 hours at a temperature of about 180° C. with an 80% solution while this point is reached only at 200° C. with a 30% solution.

The following examples will illustrate the practice of the invention while in no way limiting the same thereto.

*Example 1*

An aqueous solution containing 30 g. of L-pyroglutamic acid, $[\alpha]_D^{20}=11.7°$ (water, c=4), and 100 g. of water was heated in an autoclave at 200° C. for six hours. The solution was cooled to 30° C. and crystallized pyroglutamic acid was filtered off. The crystals weighed 22 g. Their optical rotation was measured and found to be zero, $[\alpha]_D^{20}=0$ (water, c=4). The mother liquor also showed no optical activity. Accordingly, complete racemization was accomplished.

*Example 2*

30 g. of D-pyroglutamic acid, $[\alpha]_D^{20} = +11.7°$ ($H_2O$, c=4), and 30 g. of water were mixed and heated in an autoclave at a temperature of 180° C. for eight hours. After the mixture was cooled to 30° C., 23.5 g. of r-pyroglutamic acid crystals were obtained. The crystals were heated for three hours at 100° C. in a 2 N-aqueous hydrochloric acid solution, sufficient sodium hydroxide was then added to this solution to adjust its pH to 3.2 and the crystallized r-glutamic acid resulting from this treatment was filtered off. The crystals weighed 15 g. and their optical rotation was found to be zero, $[\alpha]_D^{20}=0$ (2 N—HCl, c=6).

*Example 3*

After heating a mixture of 26.3 g. of L-pyroglutamic acid and 70 g. of water at 200° C. in an autoclave for eight hours, 56 g. of 98% sulfuric acid was added to the reaction mixture and its was further heated at 115° C. for three hours. 20.31 g. of the resultant product was treated with 5 ml. of 35% hydrochloric acid and sufficient water was added until the total volume was 50 ml. The optical rotation was measured and found to be $[\alpha]_D^{20}=0$, i.e, perfect racemization had been obtained.

The measurement of the nitrogen in the amino state showed that a 98% yield of r-glutamic acid was obtained, based on the L-pyroglutamic acid. As it was known that the equilibrium between glutamic acid and pyroglutamic acid in the stated conditions of hydrolysis is 98:2, the results showed that the racemization proceeded without any decomposition of pyroglutamic acid or glutamic acid.

What is claimed is:

1. A process of racemizing optically-active pyroglutamic acid, comprising the steps of mixing the optically-active pyroglutamic acid with water in a weight ratio of acid to water between 10:90 and 90:10, any substance selected from the group of alkaline and acidic substances present in the mixture being limited to a molar ratio of less than 0.75 in the case of an alkaline substance and less than 1 in the case of an acidic substance, in relation to the pyroglutamic acid, and heating the mixture to a temperature between about 160° C. and 220° C.

2. The process of claim 1, wherein the molar ratio of the acidic substance to said pyroglutamic acid is less than 0.5.

3. The process of claim 1, wherein the pyroglutamic acid content in the mixture is at least 30% by weight of the water.

4. The process of claim 1, wherein the mixture is heated at a minimum temperature of 180° C.

References Cited by the Examiner

UNITED STATES PATENTS 2,995,602  8/61  Kawai et al. _____ 260—326.3

NICHOLAS S. RIZZO, *Primary Examiner.*

WALTER A. MODANCE, *Examiner.*